United States Patent
Clark et al.

(10) Patent No.: US 8,179,327 B1
(45) Date of Patent: May 15, 2012

(54) SUBSURFACE DEPLOYABLE ANTENNA ARRAY

(75) Inventors: James H. Clark, West Topsham, VT (US); Norbert E. Yankielun, Deer Isle, ME (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 490 days.

(21) Appl. No.: 12/587,327

(22) Filed: Sep. 25, 2009

(51) Int. Cl.
- H01Q 1/34 (2006.01)
- H01Q 1/16 (2006.01)
- H02G 11/02 (2006.01)

(52) U.S. Cl. ........ 343/709; 343/710; 343/719; 343/877; 114/328; 174/69

(58) Field of Classification Search .................. 343/709, 343/710, 719, 707, 790, 792, 877; 324/347, 324/357, 365; 114/312, 328; 174/69
See application file for complete search history.

(56) References Cited

U.S. PATENT DOCUMENTS

| | | | | |
|---|---|---|---|---|
| 2,187,575 A | * | 1/1940 | Schroder | 33/750 |
| 5,319,376 A | * | 6/1994 | Eninger | 342/357.4 |
| 5,668,565 A | * | 9/1997 | Robinson | 343/895 |
| 5,933,117 A | * | 8/1999 | Gerhard | 343/709 |
| 5,940,046 A | * | 8/1999 | Saleem | 343/872 |
| 5,977,918 A | * | 11/1999 | Sirmalis | 343/709 |
| 6,127,983 A | * | 10/2000 | Rivera et al. | 343/767 |
| 6,683,579 B1 | * | 1/2004 | Riveria | 343/709 |
| 6,710,746 B1 | * | 3/2004 | Anderson et al. | 343/701 |
| 6,870,508 B1 | * | 3/2005 | Rivera | 343/709 |
| 7,119,763 B2 | * | 10/2006 | Okuda | 345/36 |
| 7,165,504 B1 | * | 1/2007 | Miller | 114/328 |
| 7,226,328 B1 | * | 6/2007 | Puzella et al. | 441/11 |
| 7,446,535 B1 | * | 11/2008 | Tenghamn et al. | 324/365 |
| 7,602,191 B2 | * | 10/2009 | Davidsson | 324/347 |

* cited by examiner

*Primary Examiner* — Jacob Y Choi
*Assistant Examiner* — Amal Patel
(74) *Attorney, Agent, or Firm* — James M. Kasischke; Michael P. Stanley; Jean-Paul A. Nasser

(57) ABSTRACT

A subsurface deployable antenna array is provided which expands upon deployment and contracts for storage to provide an antenna array that can be stored in a comparatively compact space. Electronically interconnected antenna modules are connected by expandable/contractable connectors. A helically-organized bundle of optical cables and electrical wiring are utilized in the expandable/contractable connectors. Mechanical, electrical, or hydraulic means may be utilized to control the spacing between the antenna modules.

14 Claims, 8 Drawing Sheets

SUBSURFACE DEPLOYABLE ANTENNA ARRAY

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to subsurface deployable antennas and, more particularly, to a cable deployed antenna array having watertight antenna elements which move away from each other for operation, and then move toward each other for compact storage.

(2) Description of the Prior Art

It is a challenge for undersea vehicles to maintain broadband communications via satellite links and with surface vessels while remaining undetected at cruising speed and depth.

The electrical conductivity of seawater inhibits electromagnetic radiation (radio signals) from penetrating to significant depths below the sea surface. At HF, VHF, UHF and microwave frequencies, the "skin depth," or depth to which a given wavelength of radio energy will penetrate, is limited to a few centimeters. As a general rule, penetration into seawater is shallower with decreasing wavelength (increasing frequency). Therefore, without an external antenna, an undersea vehicle cannot remain undetected and communicate at depth and speed.

For communications at cruising speed and depth, undersea vehicles have had to rely upon extremely low frequency (ELF) transmissions. The ELF wavelength of the electromagnetic radiation is measured in kilometers (frequencies in the kilohertz range). Seawater skin depths at these frequencies permit communications to some significant depth, but the long wavelengths limit the bandwidth of the transmitted signal. Consequently data rates are extremely low. This low data rate can make it difficult or impossible to transmit lengthy messages or images.

For undersea vehicles to currently communicate at shorter wavelengths (i.e., HF, VHF, UHF and microwave frequencies) the undersea vehicle can come near to the surface and extend a whip antenna or mast above the sea surface. However, at shallow depths, the undersea vehicle is easily detectable and vulnerable.

Towed buoyant antennas have been developed over time and successfully employed, but not without some technical deficiencies at ELF through HF wavelengths. Research has been continuing into developing low-profile antenna arrays for satellite and surface vessel communications in the VHF, UHF and microwave regimes. At these shorter wavelengths, significant bandwidth is available and consequently higher data rates can be achieved.

However, the relatively small and low profile antennas are susceptible to washover. Washover is the condition where an antenna becomes inundated by seawater. The degree and frequency to which an antenna is briefly rendered inoperable by washover is a function of antenna geometry, speed and course, as well as sea wave parameters.

Current developments in low-profile antenna design employ multiple element antennas to overcome the effects of washover. Multiple antennas in an array increase the probability of at least one antenna being exposed rather than washed over at any given time. Multiple antenna arrays are also used for increasing overall antenna gain and to permit array phasing and directional beam forming. In the prior art, these multiple antenna arrays require substantial storage space when not deployed. The problem is that undersea vehicles have very limited available storage space.

The following United States patents describe various prior art systems that may be related to the above and/or other electronics equipment storage systems:

U.S. Pat. No. 6,870,508, issued Mar. 22, 2005, to Rivera, discloses a slotted antenna with a plurality of loop structures and interconnecting conductors that define a slot. The antennas can operate in a single band or over multiple bands. Flexible or inflatable substrates enable easy storage aboard an underwater craft and facilitate deployment and towing behind an underwater craft with minimal chances of detection.

U.S. Pat. No. 7,226,328, issued Jun. 5, 2007, to Puzella et al., discloses an extendable spar buoy sea-based communication system includes a spar buoy having a retracted configuration deployable from an underwater vessel and an extended configuration after deployment, and a communication subsystem mounted to the top of the spar buoy and supported thereby.

U.S. Pat. No. 7,199,763, issued Apr. 3, 2007, to Bryan, Jr. et al., discloses an antenna system for operation near a ground plane, for example, at or near the surface of a body of water. The system also includes, for example, a buoyant support and/or housing for transporting the antenna to and/or maintaining the antenna at or near the surface of a body of water.

U.S. Pat. No. 6,710,746, issued Mar. 23, 2004, to Anderson et al., discloses an antenna having a reconfigurable length, and a method of reconfiguring an antenna. The antenna can comprise an enclosed composition capable of forming plasma operable as an antenna, an energy source configured for applying variable energy levels to the composition to thereby form variable plasma configurations, and an enclosure containing the composition. The enclosure can have a proximal end, wherein upon application of a first energy level to the composition, a first plasma length with respect to the proximal end is formed, and upon application of a second energy level to the composition, a second plasma length with respect to the proximal end is formed.

U.S. Pat. No. 6,683,579, issued Jan. 27, 2004, to Rivera, discloses a compact antenna that transmits and receives broadband electromagnetic energy signals over a hemispherical pattern in air at the ocean's surface. The antenna has an elongate semi-cylindrical shell, a circular end disc connected to one end, and a semi-circular end disc connected to the other end to form a half-cylinder cavity. A curved plate is connected to the circular end disc and a curved body portion has a curved end extending parallel with the semi-cylindrical shell. A vertical stem has an upper portion connected to the curved plate. The semi-cylindrical shell, circular end disc, semi-circular end disc, and vertical stem are made from a material that is conductive of electromagnetic signals, and they can be differently dimensioned to change the center frequencies to embrace different broadband ranges. The antenna is deployed and retrieved from a submarine in a tow body.

U.S. Pat. No. 6,127,983, issued Oct. 3, 2000, to Rivera, discloses a wideband, low-profile, towable submarine antenna. The antenna is formed with a metal cylinder having a longitudinal slot. The entire antenna may be encapsulated in a tow body and towed horizontally on the surface of the water. The longitudinal slot is open at one end and closed, or shorted, at the opposite end. The location of the antenna feedpoint is placed along the slot so as to set up two sets of frequency resonances. This configuration provides two voltage standing wave ratio minimums, thereby extending the effective reception and transmission range over the entire military UHF frequency range (225-400 MHz).

U.S. Pat. No. 5,977,918, issued Nov. 2, 1999, to Sirmalis, discloses a hydrodynamically and stealth shaped suite of antennas and sensors mounted above a hydrodynamically and stealth shaped mast. The mast is configured to extend from the sail of a submerged vessel to the surface so as to provide the vessel with satellite communications capabilities. The hydrodynamic shape of the mast minimizes the surface wake and the stealth shape of the antenna suite and mast minimizes the radar cross section of the system, lessening detection by hostile forces. To obtain a stealth shape, the radar suite utilizes a conformal phased array antenna. In addition, electrooptical sensors in the antenna suite provide visual, environmental and other sensing capabilities to the system. Further, structurally embedded ESM antennas provide ESM and radar capabilities. When in the retracted position, the antenna system conforms to the hydrodynamic and stealth shape of the submerged vessel and the conformal phased array of the antenna suite forms an integral part of the conformal phased array of the vessel.

U.S. Pat. No. 5,940,046, issued Aug. 17, 1999, to Saleem, discloses an easily reconfigurable mast antenna system disposed within an RF transparent radome where modularly, interchangeably designed antenna of the system are detachably attached to each other via an electronic interface connector and to a carrier backbone. RF, DC and fiber optic cables transmit signals to antennas operating in the range of 5 kHz to 18 GHz.

U.S. Pat. No. 5,933,117, issued Aug. 3, 1999, to Gerhard, discloses a buoyant loop antenna, deployable along a cable, which includes a core region comprising a plurality of annular ferrite beads. These annular shaped beads include a center hole and generally concave first end and a generally convex second end. The ferrite beads are aligned with the concave end of one bead against the convex end of another bead. This allows the cable to flex while the beads maintain contact with each other, providing flexibility and resistance to crushing. The core region has a loop wire wrapped helically around it, forming the loop antenna. The loop wire element starts and ends at the same end of the core region, forming a loop. This loop allows transmission and reception in and athwart (side to side) direction. This novel wire loop antenna can be combined with a straight wire antenna (which provides reception in a fore and aft direction) to provide an omni-directional cable antenna assembly.

U.S. Pat. No. 5,319,376, issued Jun. 7, 1994, to Eniger, discloses an improved ice penetrating arctic buoy for release from a submarine submerged under a layer of ice. The device includes a Global Positioning System navigational processor receiver and/or a Emergency Position Information Radio Beacon and/or surveillance apparatus, an antenna for transmission and/or reception of appropriate RF frequencies, such as Global Positioning System or other R.F. frequencies found in the environment above the ice or EPIRB R.F. frequencies originating in the buoy into the environment above the ice. Convertor means converts navigational information and/or other information outputted from said Global Positioning System receiver into coded corresponding information. An onboard transmitter sends coded information acoustically or optically and/or electrically to the submarine via an underwater data link.

U.S. Pat. No. 7,165,504, issued Jan. 23, 2007, to Miller, discloses an antenna linear extension and retraction apparatus and method of use for a submersible device. The apparatus includes a body having a cavity formed at an external surface. A bladder containing a core material is arranged within the cavity. The core material contracts and expands the bladder depending upon a pressure that surrounds the bladder. An antenna is operatively connected with the bladder and moves between a retracted position and a deployed position as the bladder contracts and expands.

The above-cited prior art does not adequately disclose a low-profile, undersea antenna array implementation that is stored in a retracted (or physically compressed) state while stowed in a limited storage space, but upon deployment, expands to a full operational dimension. As such, a continuing need exists for an antenna that reassumes a compact state during the retrieval and stowing process. Such a novel implementation would allow for control over the inter-antenna element spacing, thus making it feasible to mechanically adjust the antenna for optimum hydrodynamic performance (and minimal washover) for a given sea state. The same ability to modify antenna element spacing would be applicable to array phasing and beam forming considerations. Summarizing, a long felt need exists for the solutions to the above-described and/or related problems.

SUMMARY OF THE INVENTION

It is therefore a primary object and general purpose of the present invention to provide an improved subsurface deployable antenna array.

It is a further object of the present invention to provide a self-deploying and/or low-profile undersea antenna.

It is a still further object of the present invention to enable HF, VHF, UHF and/or microwave communications while at cruising speed and depth.

It is a still further object of the present invention to provide an antenna array which can be compactly stowed.

It is a still further object of the present invention is to provide an antenna array that can be automatically retrieved, compacted and stowed at termination of deployment while at cruising speed and depth.

Accordingly, the present invention provides an apparatus as a subsurface deployable antenna array. The antenna array may comprise elements such as a tow cable which is deployable from a subsurface vessel. A plurality of watertight antenna modules is slidably mounted on the tow cable. The watertight antenna modules are electrically interconnected so as to cooperate to form the antenna array. The watertight antenna modules may comprise a specific gravity whereby buoyant force acting on the watertight antenna modules urges the watertight antenna modules to float on a surface of a body of water. In this way, the antenna array at least substantially conforms to the surface of the body of water.

Expandable and contractable connectors are disposed between respective ones of the plurality of watertight antenna modules. Preferably, the tow cable extends through the expandable and contractable connectors.

After deployment, the antenna array is expandable in a direction substantially parallel to the water surface as the plurality of antenna modules slide away from each other over the tow cable. The connectors are contractable for storage of the antenna array whereby an overall length of the antenna array contracts as the plurality of antenna modules are urged to slide toward each other. The connectors are sufficiently flexible that when expanded to permit respective ones of the plurality of antenna modules to individually floatingly conform to a variable surface of the water. The connectors may include a helical fiber optic and metallic signal path.

In one embodiment of the present invention, the connectors may include remotely controllable hydraulic or mechanical assemblies operable for adjusting spacing between the antenna modules whereby an overall length of the array is remotely controllable.

In another embodiment of the present invention, the expandable and contractable connectors include a helical spring which is mounted between the respective ones of antenna modules. A low coefficient of friction polymer coating may be disposed between the tow cable and the watertight antenna modules slidably mounted on the tow cable.

The subsurface deployable antenna array may further include a flexible skin surrounding the helical spring. The end-most watertight antenna module may be affixed in position on the tow cable. The watertight antenna modules may each include an electro-optical circuit which converts between radio signals and optical signal. The electro-optical circuit is connected to the optical signal path through the tow cable.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1A:
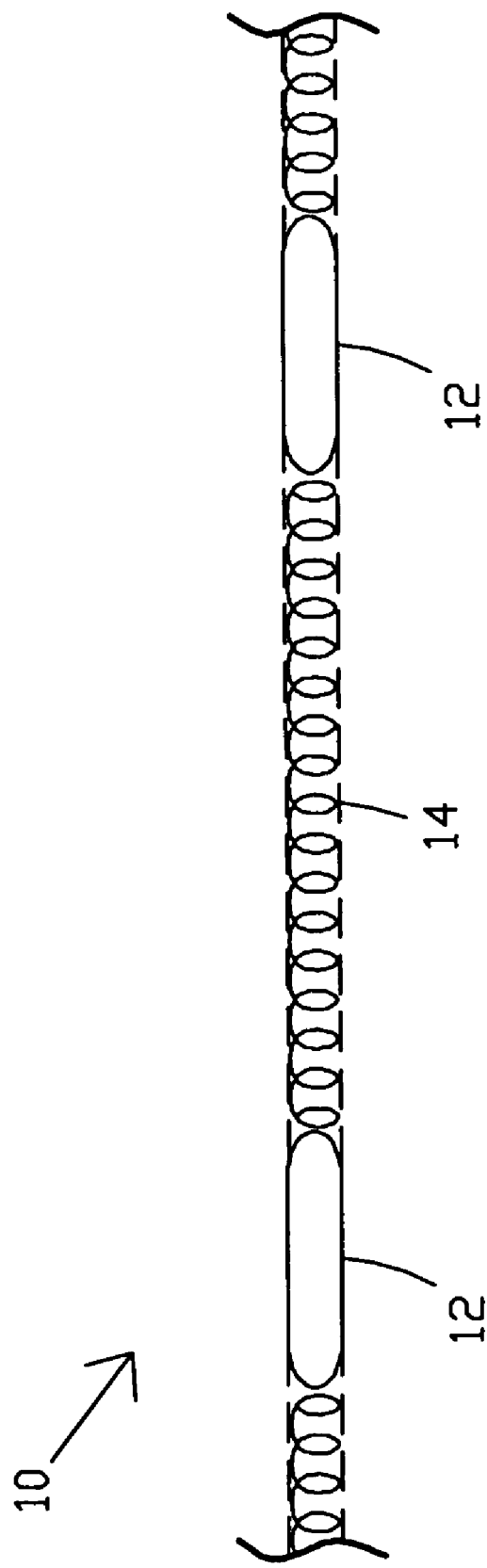
FIG. 1A depicts an elevational view of a plurality of antenna modules slidably mounted on a tow cable with the antenna modules being expanded away from each other in accordance with one possible embodiment of the present invention.
Figure 1B:
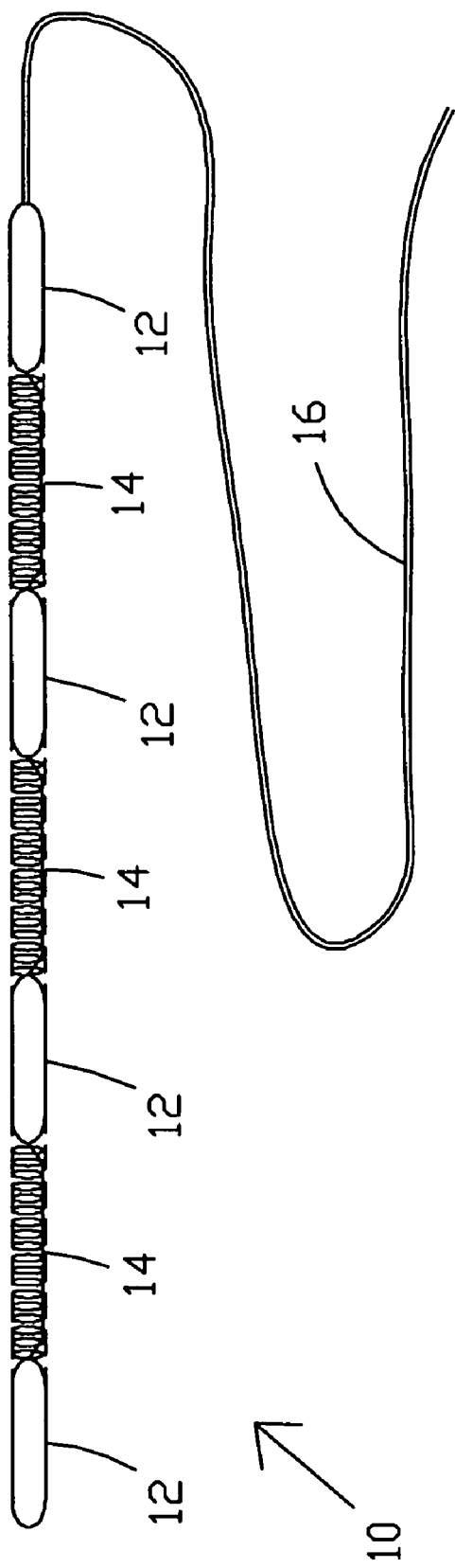
FIG. 1B depicts an elevational view the antenna modules and tow cable of FIG. 1A with the antenna modules contracted toward each other in accordance with one possible embodiment of the present invention.
Figure 2:
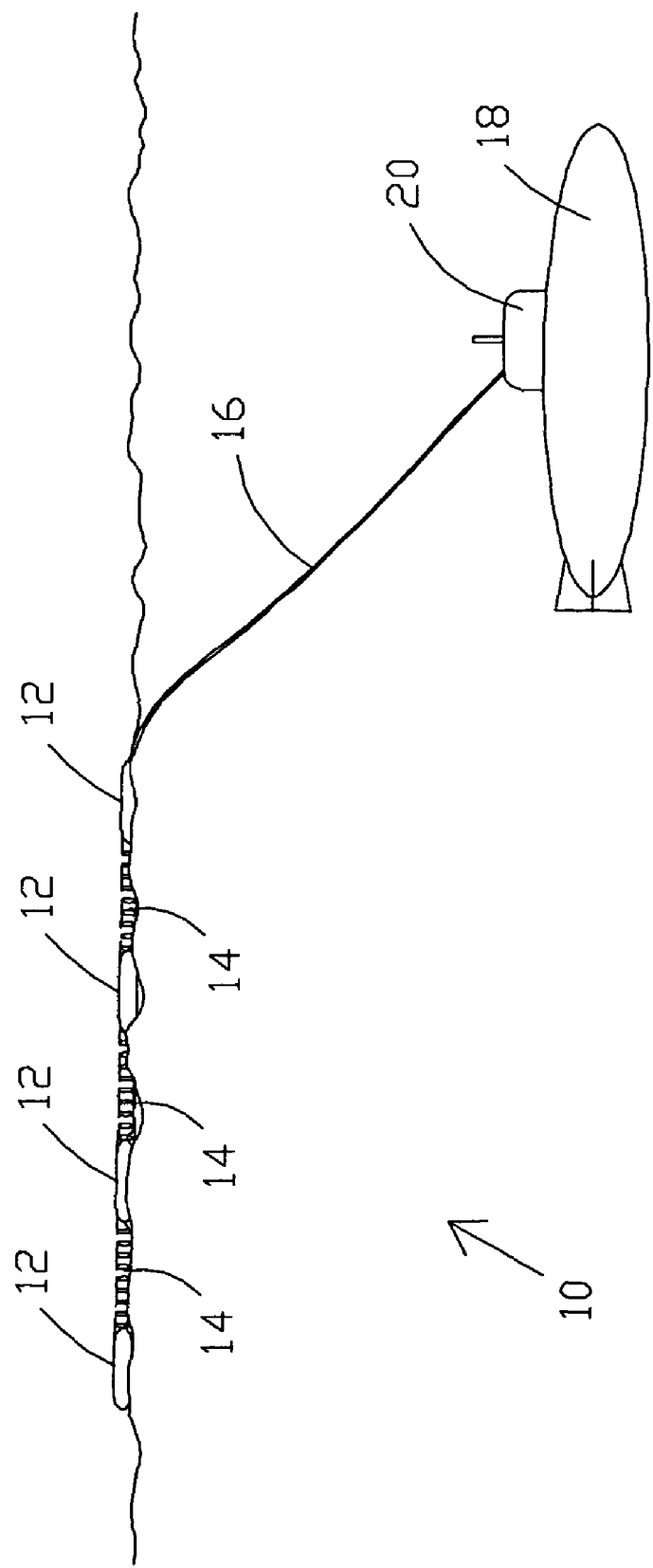
FIG. 2 depicts deployed antenna modules expanded from each other and floating on the sea surface while being towed by a undersea vehicle which may be operating at cruising speed and depth in accordance with one possible embodiment of the present, invention.

Referring now to the drawings, and more particularly to FIG. 1A, FIG. 1B, and FIG. 2, there is shown one embodiment of antenna array 10. The antenna array 10 comprises a plurality of antenna modules 12 which may vary in number. Each antenna module 12 may comprise one or more antenna elements, which may be configured in a wide variety of different ways.

Disposed between the antenna modules 12 are expandable/contractable connectors 14. The spacing between the antenna modules 12 is determined by the state of the expandable/contractable connectors 14. In FIG. 1A, the connectors 14 are shown in an expanded state thereby increasing the spacing between the antenna modules 12. In FIG. 1B, the connectors 14 are shown in a contracted or stowable configuration.

The connectors 14 comprise metallic and/or fiber optic cables which interconnect with the antenna modules 12. The metal wiring discussed herein may typically comprise copper wiring. The metallic and/or fiber optic cables in the connectors 14 are discussed in more detail hereinafter with respect to FIGS. 4, 5A, 5B, and 5C.

Accordingly, the expandable/contractable connectors 14 provide control over the inter-antenna element spacing of the antenna array 10. In one embodiment, the connectors 14 may be utilized to mechanically adjust the antenna array 10 for optimum hydrodynamic performance (and minimal washover) for a given sea state. The same ability to modify antenna element spacing of the antenna array 10 is applicable to array phasing and beam forming considerations.

The tow cable 16 may comprise metallic and/or optical cables to interconnect the antenna array 10 with a vessel such as a submarine 18 as shown in FIG. 2. The present invention provides a low-profile, antenna array with an array implementation of antenna modules that can be stored in a retracted (or physically compressed) state. Therefore, the antenna array 12 may be stowed in a limited storage space typically associated with submarines. Upon deployment, the antenna array 10 expands to a full operational dimension.

Figure 3:
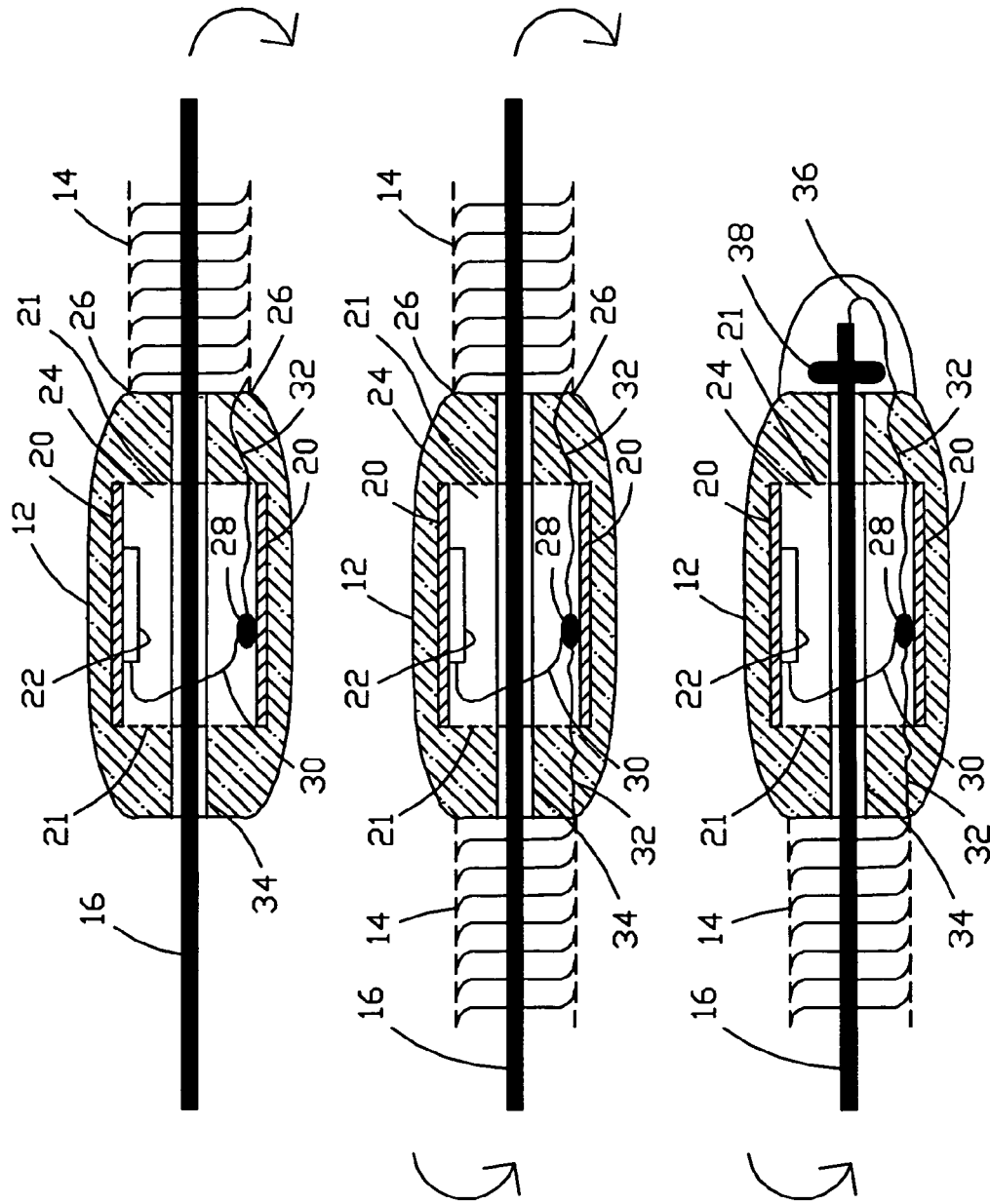
FIG. 3 depicts an elevational view, partially in a cut-away view, with sequential views of the antenna modules mounted on a tow cable as indicated by the arrows beginning with the aft-nearest antenna module closest to an undersea vehicle (shown at the top of the page) and ending at the bottom of the page with the aft-most antenna module with the modules enlarged to disclose interfacing connections of antenna modules on the tow cable with expanded helical connectors between the modules in accordance with one possible embodiment of the present invention.

FIG. 3 is an elevational view, partially in cut away, with sequential enlarged views of the antenna modules 12 shown in a sequence in which the antenna modules are positioned on the tow cable 16, as indicated by the arrows. The top of FIG. 3 depicts the aft-nearest antenna module 12 closest to the submarine 18. Following the arrows, a middle-positioned antenna module 12 is shown at the middle position of FIG. 3. While three antenna modules are shown, the antenna array 10 may include any number of antenna modules. The antenna modules 12 are enlarged to more clearly show the interfacing connections.

Each antenna module 12 may also comprise a watertight dielectric structure. Depending upon design and application, the antenna module 12 may be cylindrical and may comprise textural or shape features that mitigate washover and/or improve hydrodynamics. The cylindrical structure may be utilized to house antenna(s) 20 and associated electronics and electro-optical components 22 within a water-tight chamber 24. The antennas 20 may include antenna elements and/or connectors 21, which are indicated by dash lines.

Each connector 14 is secured to one or more associated antenna modules 12, for example, at anchor points 26. The antenna modules 12 comprise termination and distribution nodes 28 for cable assemblies within each connector, which are discussed hereinafter with respect to FIG. 4, FIGS. 5A, 5B, and 5C. Thus, nodes 28 may connect to metal wiring and/or optical fibers 30, which connect to the electronics and electro-optical components 22.

The nodes 28 may also connect to metal wiring and/or optical fibers 32 which connect to inter-module compressible helical cable assemblies that provide signal paths to the adjacent antenna. The middle-positioned antenna modules 12 comprise metal wiring and/or optical fibers 32 on both sides thereof to associated connectors 14.

The end-most or terminal antenna module 12 connects to metal wiring and/or optical fibers of the tow cable 16—as indicated at a cable connection 36. End-most or terminal antenna module 12 may be secured to the tow cable 16 and/or prevented from sliding by stop 38 and/or other securing means as desired.

The antenna modules 12 may comprise a cylindrical structure that defines an internal-axially oriented receptacle 34 through which the tow cable 16 passes and slides during deployment and recovery. The receptacle 34 is fabricated in such a manner as to maintain the watertight character of the chamber 24 in which the antenna 20 and associated electronics and opto-electronics 22 may be housed. The receptacle 34 and/or the tow cable 16 may be lined with a low coefficient of friction material (e.g., Teflon®) to facilitate a sliding action over the tow cable as the array is expanded or contracted.

Inside of the antenna modules 12, a wide variety of types of antennas and electronic configurations may be housed, depending on the particular application. Single or multiple antennas operating at the same or widely different frequency bands may be installed. The antenna configurations can be anything from simple dipole antennas to more complex slotted cylinder antennas—again depending on operational needs. The antennas 20 may be imbedded in the dielectric material of the antenna module 12 and/or be mounted within the chamber 24.

Figure 4:
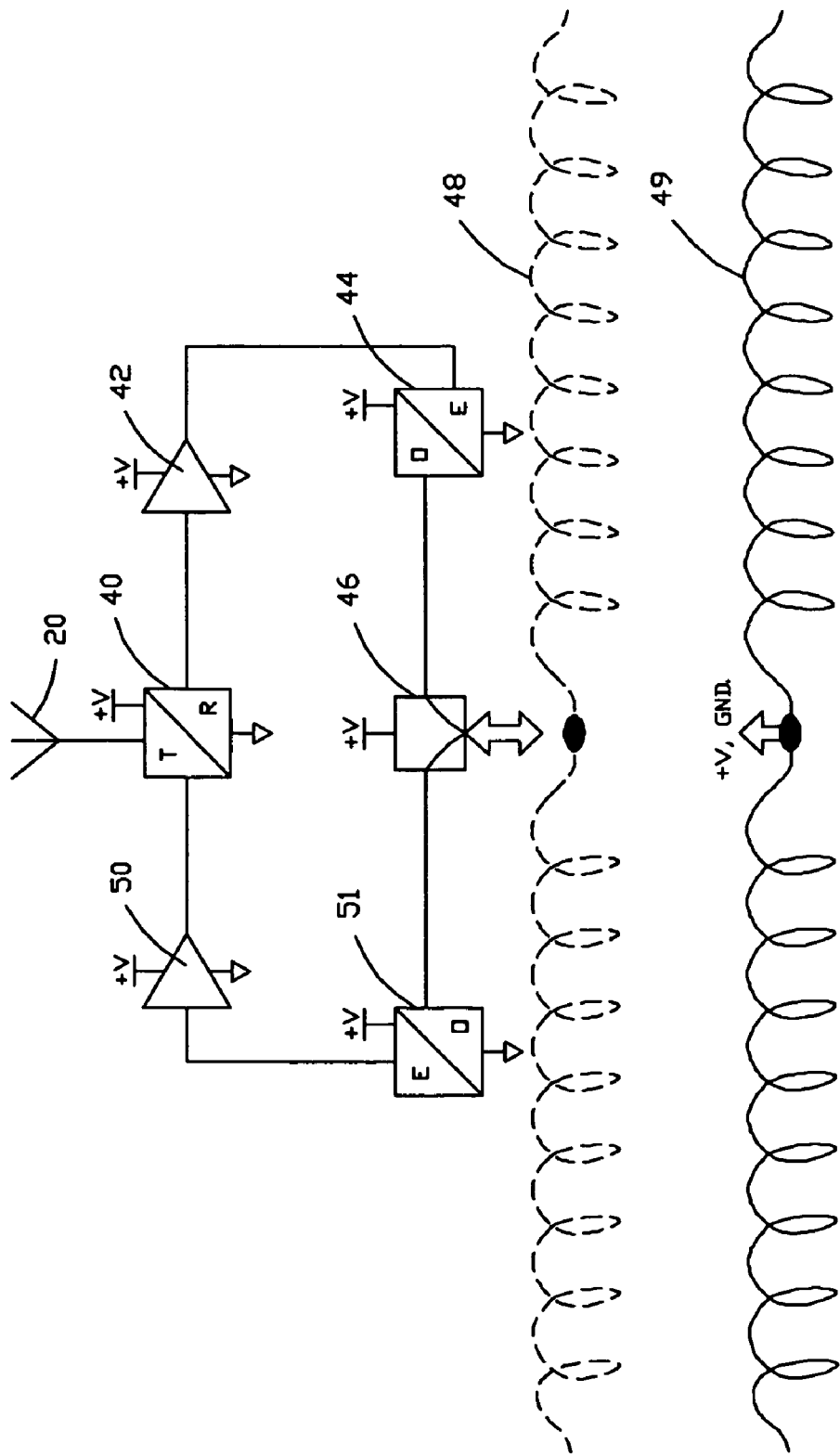
FIG. 4 depicts a schematic which discloses antenna module electronics and an electro-optical configuration as well as optical and metallic signal paths of the connectors between the modules in accordance with one possible embodiment of the present invention.

FIG. 4 illustrates a schematic of one configuration of electronics and electro-optical components. In the figure, the antenna 20 is schematically shown connected to transmit/receive (T/R) switch 40 that enables electronic transfer of the antenna from a receive mode of operation to a transmit mode of operation. Alternatively, a circulator may be used to perform a similar function.

A low noise amplifier 42 is connected to the receiver side output of the T/R switch 40. The low noise amplifier 42 increases the gain of a received signal to the appropriate level for an electronic-to-optical converter 44. The radio wave energy may be converted into photonic energy at the same carrier frequency as was received. The electronic-to-optical converter 44 may also perform a multiplexing function to wavelength multiplex the received signal onto an optical carrier. This photonic representation of the radio wave signal may be passed through an optical coupler 46 into helical fiber optic cable 48 that interconnects the adjacent antenna modules 12 until reaching the end-most antenna module. From there, the signal may be passed down an optical fiber in the tow cable 16 back to appropriate signal conversion and processing equipment shipboard.

Similarly, on the transmit side of T/R switch 40, a power amplifier 50 is connected to the antenna module 20. The input of the power amplifier 50 is connected to an optical-to-electrical converter 51, through a coupler 46, and through a preferably helical fiber optic path 48 that connects adjacent antenna modules 12. The fiber optic path 48 and mechanical wiring path 49 are shown in a helical configuration.

Eventually the signal is passed back to the fiber optics of the tow cable 16 to the appropriate transmitter electronics onboard. While other configurations of optical and/or copper wiring could be utilized than helical so long as they accommodate the expandable/contractable nature of the connectors 14, a helical configuration is the preferred embodiment.

Running in parallel with the helical fiber optic path 48 is a helical bundle of copper wires 49 that carry electrical power, ground and any necessary control signals that are distributed to each of the antenna modules 12. While FIG. 4 shows the fiber optic path 48 and copper wiring path 49 separately for clarity, preferably both helixes are wound together. These wires are connected to their onboard source preferably through multiple optical fibers and copper wires in the umbilical tow cable 16.

The circuitry of FIG. 4 is shown as an example only and other configurations may be utilized. For example, in other applications, separate transmit and receive antennas and different arrangements of electronics and photonics may be employed. Other signals may also be sent to the antenna electronics module via the fiber cable and tapped off the fiber for control or module monitoring functions (not shown). A means of multiplexing or combining the transmitted and received signals on the optical fiber may be used, for example, as part of the optical coupler 46.

Internally and structurally, the tow cable 16 is similar to a "typical" submarine tow cable with the exception of having a very low coefficient of friction jacket 52 (indicated schematically as a dashed line component in FIG. 5B and FIG. 5C) over part or all of the length, so that the antenna modules 12 slide more easily over the tow cable.

The tow cable jacket 52 is an abrasion resistant flexible polymer. The tow cable jacket 52 is provided at least on the portion of the tow cable over which the antenna modules 12 slide during deployment and retrieval. The tow cable jacket 52 may be manufactured from a low coefficient of friction polymer. In this way, the tow cable 16 passes easily through the center receptacles 34 of all included antenna modules 12 and interconnects to the compressible helical cable at the aft-most antenna module—as indicated in FIG. 3.

The tow cable 16 may comprise several copper conductors 54 (indicated schematically in FIG. 5B and FIG. 5C) used to supply appropriate antenna module power and control signals. Preferably there are several optic cables 56 (indicated schematically in FIG. 5B and FIG. 5C), for transmission of direct radio frequency energy (RF) to photonic energy. For fiber optic transmission, signal attenuation is significantly less over long cable lengths. The cable also includes a strength member (typically Kevlar®) and a buoyancy element. In some cases, there may be a hydraulic control line (not shown) for expanding/contracting the array of the antenna array 10.

Figure 5A:
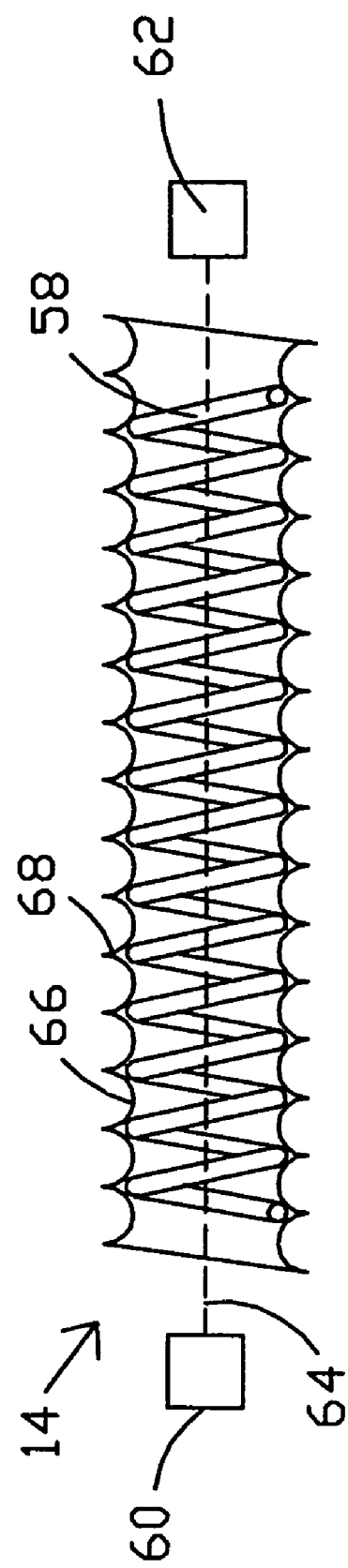
FIG. 5A depicts an elevational view in cut-away, which shows a compressible/expandable connector between the antenna modules encased in a flexible jacket in accordance with one embodiment of the present invention.
Figure 5:
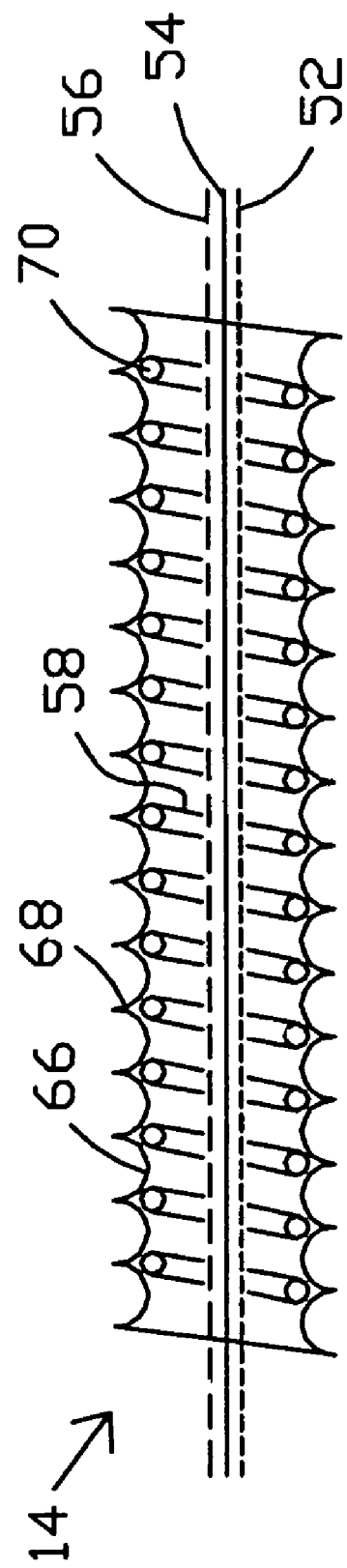
FIG. 5B depicts an elevational view in cross-section, which shows the compressible/expandable connector between the antenna modules of FIG. 5A and metallic and/or fiber optic signal paths which are slidable over the tow cable in accordance with one embodiment of the present invention.
FIG. 5C depicts an elevational view partially in cross-section, which shows the compressible/expandable connector between the antenna modules of FIG. 5B wherein the outer jacket is shown with ripples (which are exaggerated for illustration purposes) in accordance with one embodiment of the present invention.
Figure 5:
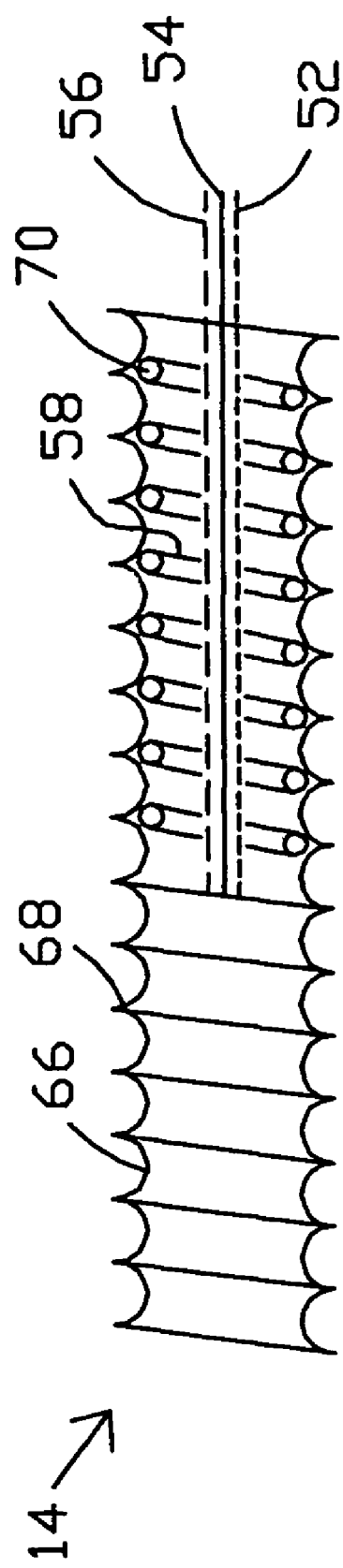

As discussed above, connector 14, which is connected between each adjacent antenna modules 12, provides signal continuity and distributes fiber and copper signal paths to each of the interconnected antenna modules 12. The connectors 14 may comprise a compressible interconnecting helical cable configuration—as indicated in FIGS. 5A, 5B, and 5C. Helical bundle 58 may comprise the fiber optic 48 and metallic signal cables.

The helical bundle 58 may also contain a strength member (typically Kevlar®) and a mechanical structural element that acts as a mechanical spring to expand the antenna array upon deployment. Hydraulic, electric, or mechanical means 60, 62, and 64 can be also employed to expand/contract the helix, depending on the particular design and application of the system. For example, the hydraulic, electric, and/or mechanical means 60, 62, and 64 may comprise remotely controllable winches which may allow a greater or less spacing between the antenna modules 12. The hydraulic, electric, or mechanical means 60, 62, and 64 may be mounted entirely within the connector 14 or may comprise end or anchor components mounted in the associated antenna modules 12.

Accordingly, there are at least two basic implementations for element spacing, namely a fixed module spacing and dynamic module spacing. The fixed spacing concept of inter-module spacing control is the simplest implementation. Here, fixed module spacing between adjacent antenna modules, via mechanical expansion of a helical spring 70 (illustrated schematically in FIGS. 5B and 5C) and/or via mechanical means such as the length of a cord, cord adjustment, or the like, has been predetermined and is not dynamically alterable.

On the other hand, dynamic module spacing enables the antenna user to remotely control the inter-module spacing, via the hydraulic, electric, or mechanical means 60, 62, and 64 thus permitting real-time dynamic adjustment. This remote controllable spacing adjustment capability enables array phasing and beam forming capability, as well as an opportunity to physically "tune" the overall array length for optimal hydrodynamic performance across a wide variety of sea states and headings.

The connector 14 may be jacketed with a comparatively tough, smooth expandable/contractable polymer skin 66 that protects the helical bundle 58 and facilitates lower hydrodynamic drag. The scallops or ripples 68 illustrated in FIGS. 5A, 5B, and 5C are exaggerated for illustration purposes. In practice, the ripples 68 are physically small to limit hydrodynamic drag and to limit wake creation and washover.

In operation, the antenna array 10 may be stored in a compressed state in a compartment of a submarine sail 20. The antenna array 10 may then be mechanically deployed while the submarine is at cruising speed and depth. As the tow cable 16 is reeled out, the antenna array 10 would physically expand as the antenna modules 12 slide apart from each other along the coaxial tow cable 16.

For a typical undersea vehicle application and due to the limited storage space available, the maximum stowed dimension of submarine antenna array 10 would be on the order of 12-15 feet in length and 6-12 inches in diameter. Upon deployment, the diameter would remain constant but the length of submarine antenna array 10 can expand to any practical and physically realizable length required for a specific application. Mechanisms and means for the cable reel deployment of towed antenna arrays currently exist.

As discussed above, expansion may occur via mechanical expansion of the inter-module helical spring, which can be assisted by other mechanical, electrical and/or hydraulic means. In one embodiment, the antenna array 10 may expand to full length after being deployed from a submarine sail 20. Once the antenna array 10 is fully deployed and expanding, the tow cable 16 continues to reel out until the buoyant antenna array 10 has surfaced and is being towed at an appropriate standoff (perhaps several hundred meters to a kilometer). The submarine 18 may continue at cruising speed and depth with the umbilical antenna fully deployed and communications link established.

Upon deployment, once the antenna array 10 has extended to a full operational length, the antenna array floats to the surface and provides a low profile communications means. The flexible design of the connectors 14 allows the antenna modules 12 to suitably follow the sea wave shape, decreasing the effects and frequency of antenna element washover. The overall antenna array 10 is substantially parallel to the surface of the body of water rather than extending vertically out of the water as other types of antennas do After a communications session is completed, the submarine 18 may continue at cruising speed and depth while retrieving the antenna array 10 by reeling in the tow cable 16. As the antenna modules 12 enter the storage space, the inter-module helical spring 70 is compressed by tension of the tow cable 16 (and perhaps assisted by other inter-module mechanical or hydraulic means). Each subsequent inter-antenna helical spring 70 is compressed as the in-reeling process continues until the full complement of the array modules 12 is again stored. Mechanisms and means for the cable reel retrieval of towed antenna arrays currently exist and are known to those ordinarily skilled in the art.

While the present invention is described in terms of use in a particular embodiment for an undersea vehicle or submarine, it will be appreciated by those of skill in the art that numerous industrial, commercial and military applications take advantage of this concept. Some potential applications include enabling HF, VHF, UHF and microwave surface communication by submerged vessels. The present invention enables HF, VHF, UHF and microwave surface communications from submerged oceanographic sensor arrays.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A sub-surface deployable antenna array, said antenna array comprising:
   a tow cable which is deployable from an undersea vessel;
   a plurality of watertight antenna modules slidably mounted on said tow cable, said plurality of watertight antenna modules being electronically interconnected, said plurality of watertight antenna modules having a specific gravity whereby a buoyant force acting on said plurality of watertight antenna modules is capable of placing said plurality of watertight antenna modules to float on a water surface to provide that said antenna array substantially conforms to the water surface;
   expandable and contractable connectors disposed between respective ones of said plurality of watertight antenna modules with said tow cable extending through said expandable and contractable connectors, said expandable and contractable connectors capable of expanding after said antenna array is deployed to the surface of the body of water whereby an overall length of said antenna array is expandable in a direction substantially parallel to the water surface after said plurality of watertight antenna modules slide away from each other over said tow cable, said expandable and contractable connectors being contractable for storage of said antenna array whereby an overall length of said antenna array is contractable as said plurality of watertight antenna modules slide toward each other, said expandable and contractable connectors being sufficiently flexible when expanded to permit respective ones of said plurality of watertight antenna modules to individually floatingly conform to a variable effect of the water surface; and wherein said expandable and contractable connectors comprise remotely-controllable assemblies operable for adjusting spacing between said plurality of watertight antenna modules whereby an overall length of said antenna array is remotely controllable.

2. The subsurface deployable antenna array of claim 1 wherein said expandable and contractable connectors include a helical-shaped fiber optic and a metallic signal path.

3. The subsurface deployable antenna array of claim 1 wherein said plurality of watertight antenna modules each comprise:
   an electro-optical circuit capable of converting between radio signals and an optical signal; and
   an optical signal path through said tow cable, said electro-optical circuit being connected to said optical signal path through said tow cable.

4. The subsurface deployable antenna array of claim 1 wherein said expandable and contractable connectors comprise a helical spring which is mounted between said respective ones of said plurality of watertight antenna modules.

5. The subsurface deployable antenna array of claim 1 said antenna array further comprising an expandable and contractable skin covering said expandable and contractable connectors.

6. The subsurface deployable antenna array of claim 1 said antenna array further comprising an aft-most watertight antenna module and a stop member on said tow cable which engages said aft-most watertight antenna module.

7. The subsurface deployable antenna array of claim 1 said antenna array further comprising a low coefficient of friction polymer coating with said friction polymer coating disposed between said tow cable and said plurality of watertight antenna modules which are slidably mounted on said tow cable.

8. A method for making a subsurface deployable antenna array, comprising:
   providing a plurality of watertight antenna modules slidably mounted on a tow cable;
   electronically interconnecting the plurality of watertight antenna modules;
   providing that the plurality of watertight antenna modules comprise a specific gravity whereby a buoyant force acting on the plurality of watertight antenna modules positions the plurality of watertight antenna modules to float on a surface of a body of water;
   positioning expandable and contractable connectors between respective ones of the plurality of watertight antenna modules;
   providing that the tow cable extends through the expandable and contractable connectors;
   providing that the expandable and contractable connectors are expandable when the antenna array is deployed whereby an overall length of the antenna array is expanded in a direction substantially parallel to the water surface when the plurality of watertight antenna modules slide away from each other over the tow cable, the expandable and contractable connectors being contractable for storage of the antenna array whereby an overall length of the antenna array contracts as the plurality of watertight antenna modules slide toward each other;
   providing that the expandable and contractable connectors are sufficiently flexible when expanded to permit respective ones of the plurality of watertight antenna modules to individually floatingly conform to a variable surface of the water; and
   providing remotely controllable assemblies operable for adjusting spacing between the plurality of watertight antenna modules whereby an overall length of the antenna array is remotely controllable.

9. The method of claim 8 wherein said providing step of the expandable and contractable connectors includes a helical fiber optic and metallic signal path.

10. The method of claim 8 comprising mounting a helical spring between said respective ones of said plurality of watertight antenna modules.

11. The method of claim 10 said method further comprising the step of providing a skin surrounding the helical spring.

12. The method of claim 8 said method further comprising the step of affixing an aft-most watertight antenna module in position on the tow cable.

13. The method of claim 8 said method further comprising the steps of:
   providing the antenna modules with an electro-optical circuit which converts between radio signals and an optical signal;
   providing an optical signal path through the tow cable; and
   connecting the electro-optical circuit to the optical signal path through the tow cable.

14. The method of claim 8 said method further comprising the step of coating the tow cable with a low coefficient of friction polymer coating.

* * * * *